United States Patent

Satoh et al.

[11] Patent Number: 5,185,020
[45] Date of Patent: Feb. 9, 1993

[54] METHOD FOR MANUFACTURING A SILICA-BASE MATERIAL FOR OPTICAL FIBER

[75] Inventors: Tsuguo Satoh; Takayuki Morikawa; Hiroshi Hihara; Takeshi Yagi; Kazuaki Yoshida, all of Tokyo, Japan

[73] Assignee: The Furukawa Electric Co., Ltd., Tokyo, Japan

[21] Appl. No.: 749,900

[22] Filed: Aug. 26, 1991

[30] Foreign Application Priority Data

Aug. 27, 1990 [JP] Japan .................. 2-224732
Apr. 23, 1991 [JP] Japan .................. 3-92028
Apr. 25, 1991 [JP] Japan .................. 3-122695
Apr. 25, 1991 [JP] Japan .................. 3-122752

[51] Int. Cl.⁵ .................. C03B 37/01; C03B 19/06
[52] U.S. Cl. .................. 65/3.11; 65/18.1; 65/901; 264/86; 427/169; 501/12
[58] Field of Search .................. 65/18.1, 3.11, 3.12, 65/901; 264/86; 425/84, 86; 427/169; 501/12

[56] References Cited

U.S. PATENT DOCUMENTS

| | | | |
|---|---|---|---|
| 2,288,661 | 7/1942 | Wadman | 264/86 |
| 2,290,671 | 7/1942 | Camilli et al. | 264/86 |
| 4,039,703 | 8/1977 | Kamijo et al. | 264/112 |
| 4,419,115 | 12/1983 | Johnson et al. | 65/18.3 |
| 4,789,389 | 12/1988 | Schermerhorn et al. | 65/18.1 |
| 4,940,675 | 7/1990 | Bohlayer | 501/12 |

FOREIGN PATENT DOCUMENTS

| | | |
|---|---|---|
| 156331 | 3/1989 | Japan . |
| 1271205 | 10/1989 | Japan .................. 264/86 |
| 1-294548 | 11/1989 | Japan . |

OTHER PUBLICATIONS

Phelps and Romig, Role of Particle-Size Distribution in Nonclay Slip Rheology, Ceramic Bulletin, vol. 50, No. 9, 1971, pp. 719-722.

Primary Examiner—Robert L. Lindsay
Attorney, Agent, or Firm—Frishauf, Holtz, Goodman & Woodward

[57] ABSTRACT

A silica-based glass rod is inserted into a space portion of a mold. Then, a slurry, which is obtained by dispersing a silica glass powder material in pure water, is poured into a molding space between the glass rod and the inner surface of the mold, whereby a porous glass shaped body is formed around the glass rod. Drying this shaped body results in a silica glass base material which includes the glass rod and the porous glass shaped body surrounding the same.

8 Claims, 4 Drawing Sheets

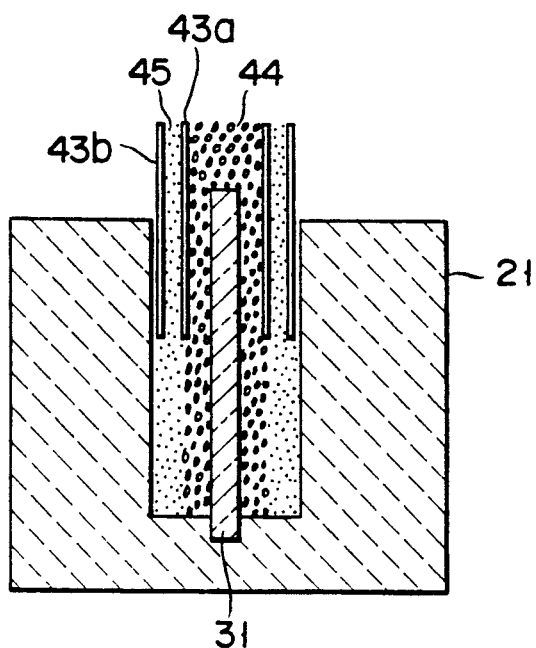
F I G. 4
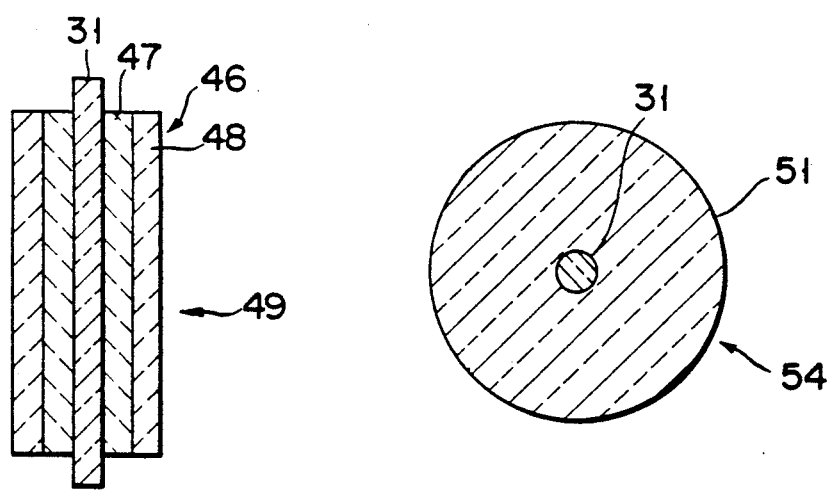
F I G. 5　　F I G. 6

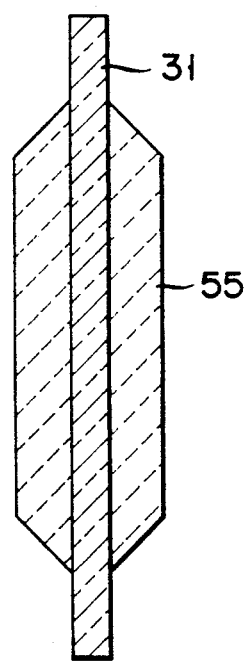 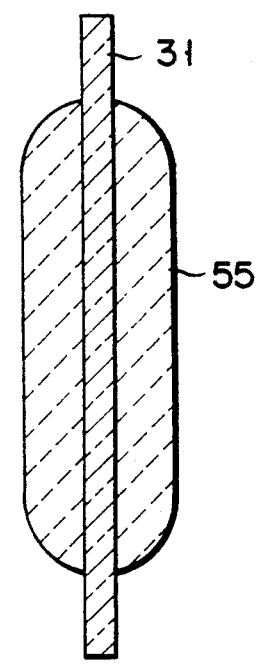
F I G. 7A    F I G. 7B

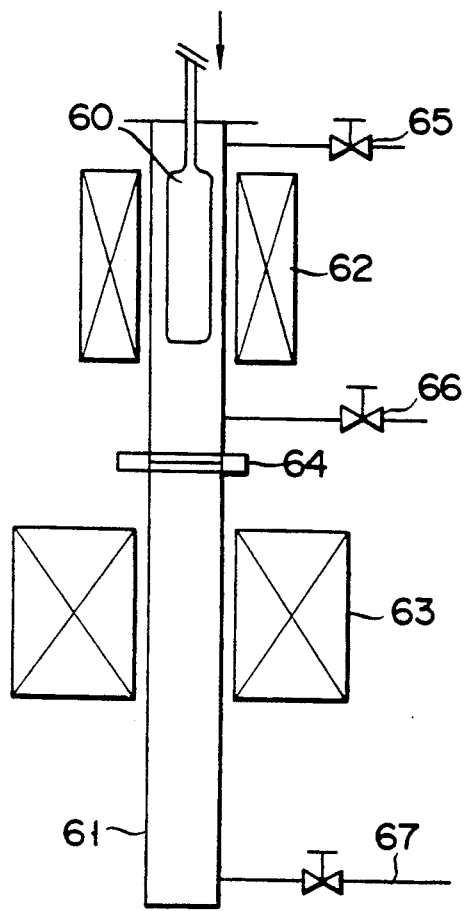
F I G. 8

METHOD FOR MANUFACTURING A SILICA-BASE MATERIAL FOR OPTICAL FIBER

BACKGROUND OF THE INVENTION

1. Field of the Invention

The present invention relates to a method for manufacturing a silica glass base material for a wave guide preform such as an optical fiber preform, image fiber preform, light guide preform, rod lens preform, etc., used in the fields of optical communication and optical applications.

2. Description of the Related Art

A CVD method, such as the VAD (vapor phase axial deposition) method, the MCVD (modified chemical vapor phase deposition) method, the OVD (outside vapor phase deposition) method, the PCVD (plasma chemical vapor phase deposition) method, etc., the slip casting method, or a method combining the VAP method and the sol-gel method may be used to manufacture a wave guide preform such as an optical fiber preform, image fiber preform, light guide preform, rod lens preform, etc., which are used in the fields of optical fiber telecommunication and optical applications.

According to the CVD method, halide gas, such as $SiCl_4$ or $GeCl_4$, is used as a starting material, which is subjected to an oxidation reaction or flame hydrolysis reaction to produce oxide powder, such as $SiO_2$ or $GeO_2$. Further, the oxide powder is deposited on a specific deposition surface (distal end face of a target, inner peripheral surface of a silica pipe, outer peripheral surface of a mandrel, etc.), and is then consolidated into transparent glass, whereupon a preform is formed.

Also, manufacturing means for a preform based on the all-synthesis VAD method has recently started to be used in order to obtain optical fibers of higher quality.

In the manufacture of a preform for single-mode optical fibers, in this connection, porous glass bodies for a core and a part of cladding in a suitable outside diameter ratio are first simultaneously synthesized by the VAD method. Then, these porous glass bodies are consolidated into transparent silica-based glass rod. In order to adjust the core-to-cladding outside diameter ratio to 10/125 ($\mu$m) (adjustment of outside diameter), thereafter, a porous glass body for cladding is deposited on the transparent silica-based glass rod by the OVD method, and the deposited body is consolidated into transparent glass preform.

According to the slip casting method, as is disclosed in Published Unexamined Japanese Patent Application No. 64-56331 and the like, first a slurry is formed by dispersing a preconditioned fine silica glass powder material in pure water, and is then poured into a molding die so that water in the slurry is absorbed by the die. Thus, a porous glass body is formed from the fine glass powder material. Thereafter, the porous glass body is dried and consolidated into transparent glass.

According to the method combining the VAD method and the sol-gel method, as is disclosed in Published Unexamined Japanese Patent Application No. 1-294548 and the like, a rod-shaped porous glass body (a combination of core glass and part of cladding glass), prepared mainly by the VAD method, and a tubular porous glass body (remainder of the cladding glass), prepared by the sol-gel method, are combined by using the rod-in-tube method. Thereafter, these porous glass bodies are consolidated together into transparent glass.

The CVD method, the slip casting method, and the method combining the VAD method and the sol-gel method, described above, have the following technical problems.

In the case of the CVD method, the efficiency of deposition of oxide powder is as low as 30 to 60%, although the technical achievement for conforming articles is high. The equipment size is very large. As mentioned above, there are some drawbacks to high yield, reasonable product cost, and economy of equipment.

The slip casting method permits high-efficiency production of high-quality porous glass bodies using simple equipment. However, a waveguide structure cannot be obtained with use of the technology of this method alone.

In the case of the slip casting method, therefore, the method itself must be improved, or otherwise, it requires use of some other suitable means. There are no technical suggestions, however, in the description of prior art examples related to the slip casting method.

In the case of the method combining the VAD method and the sol-gel method, the cost of the material, alkoxide, is high, and gilled matter is liable to crack when it is dried. Further, according to this method, it is difficult to obtain a large-sized base material.

SUMMARY OF THE INVENTION

The present invention has been contrived in consideration of these circumstances, and its object is to provide a novel method for manufacturing a silica glass base material.

Another object of the invention is to provide a method for rationally economically manufacturing a high-quality silica glass base material.

According to the present invention, there is provided a method for manufacturing a silica glass base material, which comprises: a step of inserting a silica-based glass rod into a space portion of a mold; and a step of pouring a slurry, which is obtained by dispersing a silica glass powder material in pure water, into a molding space between the glass rod and the inner surface of the molding die, thereby forming a glass powder shaped body around the glass rod.

According to the invention, the porous glass body is formed by the slip casting method, around the silica-based glass rod which is manufactured by a conventional method, so that the equipment cost is low, and the yield is high enough. Thus, the production is very economical.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a diagram for illustrating the way of effecting a second embodiment of the present invention;

FIG. 5 is a longitudinal sectional view of a silica glass base material manufactured according to the second embodiment;

FIG. 6 is a cross-sectional view of an optical fiber preform obtained by consolidating the base material of FIG. 5 into transparent glass;

FIGS. 7A and 7B are longitudinal sectional views of silica glass base materials obtained according to a third embodiment of the present invention; and FIG. 8 is a schematic view showing an example of an apparatus for treating the silica glass base material of the present invention.

DETAILED DESCRIPTION OF THE PREFERRED EMBODIMENTS

According to the present invention, a silica glass base material is manufactured by forming a porous glass body around a silica-based glass rod by the slip casting method.

In this case, the silica-based glass rod, which constitutes the core of the silica glass base material, may be one which is manufactured by a conventional method. Preferably, the rod should be prepared by a CVD method, such as the VAD method.

The CVD method is preferred for the following two reasons. First, this method is a nearly fully mature technique such that a high-quality glass rod can be produced to be used as the principal part of the optical fiber preform. Secondly, according to this method, the volume percentage of the glass rod in the preform is so low that reduction in total yield can be restrained, and increase of the equipment size can be avoided, even though the oxide powder deposition efficiency obtained with use of the CVD method is low.

In forming the porous glass body around the silica-based glass rod by the slip casting method, it is necessary only that a specific slurry be poured into a mold. Thus, the desired shaped body can be obtained with a satisfactory yield by the use of economical equipment and simple processes. In the following treatment process, moreover, the porous glass body must only be dried, purified and consolidated into transparent glass.

In manufacturing the preform with a waveguide structure by the method of the present invention, therefore, high-yield production can be ensured with low equipment cost. Thus, the product cost can be lowered, and the production is very economical.

The present invention will now be described in detail.

Figure 1:
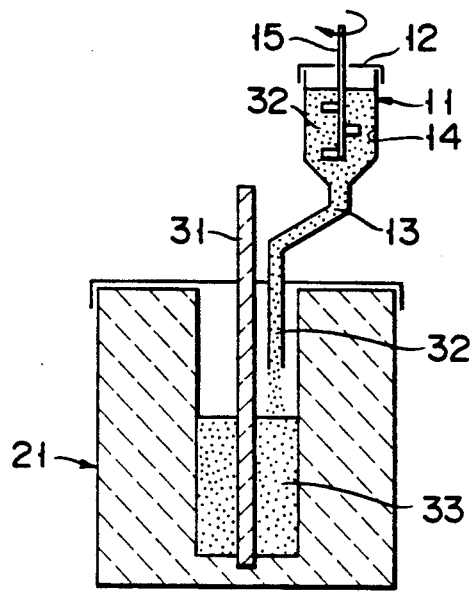
FIG. 1 is a diagram for illustrating the way of effecting a first embodiment of the present invention.

FIG. 1 is a diagram for illustrating the way of effecting a first embodiment of the present invention.

In FIG. 1, numerals 11 and 21 designate a slurry injector and a mold, respectively.

The slurry injector 11 comprises a vessel 14 having a cover 12 and an outlet pipe 13 at the top and bottom, respectively, and a stirrer 15 set in the vessel 14. These members are made of synthetic silica glass, for example.

The mold 21 is formed of a rigid vessel which has the so-called dewatering effects, such as water absorption and dehydration properties. By way of example, the mold 21 may be a vessel with continuous pores which is formed from very fine synthetic silica powder (fumed silica). Alternatively, a resin mold or a gypsum mold may be used as the mold 21. These molds are used for a pressure forming method in which a slurry is injected into a molding space of a mold, applying pressure, and water of the slurry is exhausted through pores of the mold, presure-reducing forming method in which a mold is evacuated and water of the slurry is exhausted through pores of the mold, and a method combining these methods.

In FIG. 1, a silica-based glass rod 31 is obtained by dehydrating a porous glass body, which is formed by the VAD method, for example, and then consolidating it into transparent glass. The glass rod 31 may be formed of core glass only or a combination of core glass and a part of cladding glass thereon.

A slurry 32 is obtained by dispersing a silica glass powder material in pure water.

Usually, the silica glass powder material in the slurry 32 essentially consists of pure silica powder. In some cases, however, the material may be mixed with other kinds of oxide powder which serves to adjust the refractive index of silica.

Preferably, the particle diameter of the silica glass powder material ranges from 0.6 to 20 $\mu$m. Having its average particle diameter within this range, the material can enjoy desirable properties as a slurry for slip casting.

In manufacturing the preform according to the arrangement described above, first the slurry 32 adjusted to a predetermined viscosity is filled into the vessel 14 of the slurry injector 11, and is uniformly stirred by means of the stirrer 15. The silica-based glass rod 31 is vertically inserted into the axis portion of the mold 21, and the resulting state is maintained.

Then, the slurry 32 in the vessel 14 is poured into a molding space (between the outer peripheral surface of the glass rod 31 and the inner peripheral surface of the mold 21) in the die through the outlet pipe 13.

After the passage of a predetermined time, the slurry 32 in the mold 21 is dehydrated by the water absorbing effect of the mold 21 so that it is reduced in volume and forms a porous glass shaped body 33 with less water content.

Since a considerable amount of water is removed from the porous glass shaped body 33, the shaped body is dried, although not completely but to a degree such that it can maintain its own form.

After the porous glass shaped body 33 is thus formed by using the mold 21, the shaped body 33 is taken out from the die and put into a drier (not shown) to be dried therein.

Figure 2:
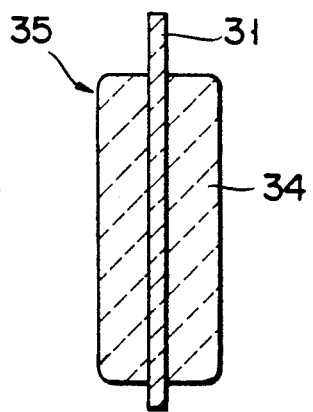
FIG. 2 is a longitudinal sectional view of a quartz glass base material manufactured according to the first embodiment.

After the porous glass shaped body 33 is dried by means of the drier, it forms a porous glass body 34 which hardly contains water, as shown in FIG. 2. Thus, a silica glass base material 35 is formed which is composed of the glass rod 31 and the porous glass body (shaped body) 34.

Figure 3:
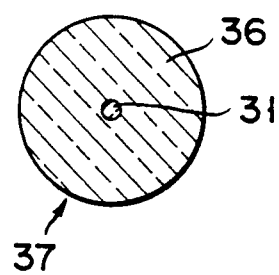
FIG. 3 is a cross-sectional view of an optical fiber preform obtained by consolidating the base material of FIG. 2 into transparent glass.

Thereafter, the porous glass body 34 is subjected to a dehydration/purification process and a consolidation process in the conventional manner. Thus, a wave guide preform, e.g., an optical fiber preform 37, can be obtained having the glass rod 31 and a transparent glass body 36 surrounding the same, as shown in FIG. 3.

After the porous glass body 34 is consolidated into transparent glass, the processes from the formation of the porous glass body to the consolidation are repeated to increase the diameter of the transparent glass body 36. Thereupon, a preform with a greater outside diameter can be obtained.

A second embodiment of the present invention will now be described. According to this embodiment, slip casting is effected so that the central portion of the molding is formed of glass powder particles with a relatively large particle diameter, and the peripheral portion of powder particles with a relatively small particle diameter.

The following is a description of the reason why the preform is manufactured in this manner.

Table 1 shows the characteristics of the porous glass body as the silica particle shaped body obtained with fixed molding conditions.

TABLE 1

| Particle diameter | Shaped body | | |
|---|---|---|---|
| | Pore diameter | Strength | Air bubbles |
| Large | Large | Low | Few |
| Small | Small | High | Many |

In this case, bubbles exist after consolidation. Many bubbles are liable to exist at the central portion of the preform. At the outer peripheral portion of the preform, however, no substantial bubbles are still because gas tends to diffuse.

The smaller the silica particle diameter, the tougher the porous glass body obtained is.

If the strength of the outer peripheral portion of the porous glass body is higher, cracks, which are caused by stress strain during the molding operation, occur less frequently, and the glass body is easier to handle.

In this embodiment, the larger silica particles are arranged in the central portion of the mold, so that bubbles can be restrained from existing in the optical fiber preform after consolidation.

Since the smaller silica particles are arranged on the inner peripheral wall side in the mold, moreover, the porous glass body is improved in mechanical strength, and can, therefore, be prevented from suffering cracks, fissures, etc.

FIG. 4 is a diagram for illustrating the way of effecting the second embodiment of the invention. A silica-based glass rod 31 and a mold 21 can be arranged in quite the same manner as those of the first embodiment.

In this embodiment, relatively large glass powder particles 44 are supplied to the central portion near the glass rod 31, and relatively small powder particles 45 are supplied to the peripheral portion.

More specifically, inner and outer coaxial loading vessels 43a and 43b are inserted into a casting space of the mold 21, and a slurry containing the coarse glass powder particles 44 is supplied to the vessel 43a, and the fine powder particles 45 are supplied to the vessel 43b.

Preferably, in this case, the average particle diameter of the coarse glass powder particles 44 ranges from 1 to 20 μm, and that of the fine glass powder particles 45 ranges from 0.6 to 1 μm.

In this embodiment, two particle diameter ranges are used. However, three or more particle diameter ranges may be used.

After the passage of a predetermined time, the slurry is dehydrated into a shaped body by means of the mold 21. When the shaped body is removed from the mold and dried by means of a drier, a porous glass body 46 is formed having a coarse-particle central portion 47 and a fine-particle peripheral portion 48. Thus, a silica glass base material 49 is manufactured which is composed of the glass rod 31 and the porous glass body 46 surrounding the same.

When the glass body 46 is subjected to a dehydration-purification process and a consolidation process, an optical fiber preform 54 can be obtained having the glass rod 31 and a monolithic transparent glass body 51 surrounding the same, as shown in FIG. 6.

A third embodiment of the present invention will now be described. According to this embodiment, both or one end of a porous glass shaped body is formed into a cone or a three-dimensional curved surface whose radius of curvature is equal to or greater than the outside diameter of the shaped body. By doing this, the surface area of the shaped body can be reduced, and its force to resist stress can be improved. As a result, the following effects can be obtained.

(1) In the case of the shaped body having the end or edge portion in the form of a cone or a three-dimensional curved surface, the edge portion of the shaped body can be prevented from chipping off when the shaped body, formed by casting, is removed from a mold, during the manufacture of a porous glass shaped body, and cracks in the shaped body can be considerably reduced.

(2) Since an optical fiber preform is formed from the silica glass base material having the conical or curved end portion, the shaped body of the silica glass base material consolidates into transparent glass from its extreme end portion as its one end is gradually inserted into a high-temperature region of a furnace to be consolidated therein. Thus, homogeneous, fine transparent glass can obtained without entailing bubbles in the central portion of the optical fiber preform.

(3) In manufacturing an optical fiber by wire drawing after the consolidation, a supporting rod or the like can be fusion bonded without changing its shape, so that the processing time can be shortened, and the material yield can be improved.

In this embodiment, a porous glass body 55 is formed around a silica-based glass rod 31 in quite the same manner as in the first or second embodiment, each end portion of the porous glass body 55 is tapered (into a conical shape), as shown in FIG. 7A, or formed into a three-dimensional curved surface having a radius of curvature equal to or greater than the outside diameter of the shaped body, as shown in FIG. 7B. In this case, the end portions of the glass body 55 can be formed by using a mold having tapered portions or three-dimensional curved portions corresponding to both end portions of the body 55, or by machining such as lathing.

The following is a description of a preferred method for treating the silica glass base material manufactured in the manner described above embodiments.

The silica glass base material manufactured according to the above embodiments is consolidated into transparent glass after undergoing the dehydration/purification process. After the dehydration/purification process, the material is exposed to He to be replaced therewith, and is then consolidated in an atmosphere containing He.

Conventionally, consolidation is performed while the porous preform is being gradually pulled down to a high-temperature region at a speed of 100 to 300 mm/Hrs. According to this method, however, if powder with a submicron-order particle diameter is used as a starting material, bubbles are liable to exist after consolidation process. More bubbles tend to exist in the central portion, in particular, where the gas diffuses slowly.

A study made by the inventors hereof indicated the following relationships between the particle diameter and pores size distribution. The smaller the particle diameter, the smaller the pore diameter is. This indicates that as the pore diameter is reduced, the removal and diffusion of the gas take a lot of time. If the particle diameter is small, moreover, the shaped body is liable to be consolidated, that is, the pores can be closed easily or quickly, so that gas cannot easily go out. These circumstances entail development of bubbles.

Prior to the consolidation process, therefore, the porous glass body is exposed to He gas. By doing this, the He gas, whose diffusion coefficient is high, is filled into the pores of the porous glass body so that no bubbles exist even though the pores are closed during the consolidation process. Before this He filling process, the porous glass body is deaerated while being heated under vacuum. By doing this, the partial pressure of the adsorbed gases in the pores can be lowered, so that the gas can more easily be removed or diffuse. Thus, bubbles are less liable to exit.

This treatment of the silica glass base material will be described further in detail.

The aforementioned silica glass base material is dried (e.g., to 100° C.) in the conventional manner, and is then heat-treated (dehydrated and purified) in He and $Cl_2$ atmosphere. Thereafter, the material is deaerated (to $10^{-2}$ torr or more) while being heated under vacuum, as required, and is then exposed to He atmosphere so that the adsorbed gases (air, chlorine gas, hydrogen chloride gas, etc.) in the pourous glass body is replaced with He. After the operations for the deaeration and the replacement with He are performed once or more, the pours glass body is heat-treated (e.g., at 1,400° to 1,600° C.) to be consolidated in an atmosphere normally containing He, whereby a preform is obtained. If the deaeration is not executed, a lot of time is used for the heat treatment in the He atmosphere. The above method may be a batch system or one in which the He treatment and the vacuum treatment are executed in tandem with the consolidation process.

EXAMPLE 1

The following is a description of Example 1 according to the first embodiment.

Used as the silica-based glass rod 31 of FIG. 1 was one whose core glass composition is $SiO_2$-$GeO_2$, cladding glass composition is $SiO_2$, core-to-cladding outside diameter ratio is ⅓, and specific refractive index difference between the core and cladding glasses is 0.3%. This glass rod 31 was of 15-mm diameter and 500-mm length.

Fine particles of $SiO_2$ with a particle diameter of 0.6 to 20 μm was dispersed in pure water to prepare a slurry with a viscosity of about 2,000 cps, for use as the slurry 32. This slurry was filled beforehand into the vessel 14 of the slurry injector 11.

A fumed-silica mold of 120-mm inside diameter and 500-mm depth was used as the mold 21 which have water absorption and dehydration properties.

As described before in connection with the first embodiment, the glass rod 31 was set in the mold 21, the slurry 32 was poured into the mold 21 by means of the slurry injector 11, and the resulting state was left to stand for 6 hours.

Thereupon, the porous glass shaped body 33 was formed around the glass rod 31.

The porour glass shaped body 33, along with the glass rod 31, was taken out from the mold 21, put into an electric oven as a driver, and heated at 100° C. for 12 hours.

As a result, the silica glass base material 35 was formed. More specifically, the silica glass base material 35 was manufactured having the porous glass body 34 around the silica-based glass rod 31.

The base material 35 was inserted into an electric furnace kept at the maximum temperature of 1,450° C., at a speed of 250 mm/hr, while being rotated. Thus, the porous glass body 34 was sintered (dehydrated, purified, and vitrified) into the transparent glass body 36, whereupon the optical fiber preform 37 was formed.

In doing this, He and $Cl_2$ were supplied to the furnace at flow rates of 5 l/min and 0.2 l/min to form an atmosphere for the dehydration/purification process and the consolidation process.

The preform thus obtained had an outside diameter of 62.5 mm and length of 300 mm.

This optical fiber preform was drawn by means of conventional drawing means, into single-mode optical fiber with an outside diameter of 125 μm.

The transmission characteristic in a wavelength band of 1.55 μm was measured for the single-mode optical fibers obtained in this manner. The resulting value was 0.18 dB/km at 1.55 μm wavelength.

This value compares favorably with that of the transmission characteristic of single-mode optical fibers based on the conventional all-synthesis VAD method, for example.

In the specific example described above, when five pieces of silica glass base material 35 were formed from the slurry 32 for each of the five optical fiber base materials (slurry casting speed: 300 l/min), the treatment time for each material was about 3.7 hours, and the yield of the fine $SiO_2$ particles was 95%.

When a silica glass base material equivalent to the specific example was manufactured by the conventional OVD method, on the other hand, the treatment time was about 10 hours with the average deposition speed of the $SiO_2$ particles at 3 g/min, and the yield of the $SiO_2$ particles was 30%.

According to the method of the present invention, as seen from the above comparison, the porous glass body can be manufactured with high yield and improved efficiency.

EXAMPLE 2

The following is a description of Example 2 according to the second embodiment.

Two types of silica slurries were prepared by dispersing 400 g of silica particles 44 with a particle diameter of 1 to 20 μm and 400 g of silica particles 45 with a particle diameter of 0.6 to 1 μm in pure water so that the ratio of the particles of each type to pure water was 1 to 0.5.

A water absorbing resin mold of 30-mm inside diameter and 300-mm length was used as the mold 21. The silica-based glass rod 31 of 2-mm outside diameter, doped with $GeO_2$ (specific refractive index difference from silica: 1%) was placed in the center of the inside of the mold 21.

The two loading vessels 43a and 43b with different inside diameters were coaxially arranged around the glass rod 31. The slurry of the coarse silica particles 44 was poured around the glass rod 31 by means of the vessel 43a, while the slurry of the fine silica particles 45 was poured outside the region for the supply of the particles 44 by means of the vessel 43b. While doing this, the vessels 43a and 43b were gradually raised. As these slurries were left to stand after being poured in this manner, water therein was absorbed by the mold 21, whereby a shaped body was produced. The resulting shaped body was released from the mold 21 when its water content was reduced to 10 to 15%.

The released shaped body was dried at 100° C. to provide a silica glass base material 49 composed of the glass rod 31 and the porous glass body 46. The base material 49 was purified in He and $Cl_2$ atmosphere at 1,000° C. for 2 hours by the conventional soot purification method, and was then consolidated in He atmosphere at 1,500° C., whereupon the vitrified optical fiber preform 54 was obtained.

The optical fiber preform 54 measured 25 mm in outside diameter and 250 mm in length. This preform 54 was drawn to produce an optical fiber of 125-μm outer diameter. The transmission loss of this optical fiber measured 0.7 dB/km at 1.55-μm wavelength.

Ten preforms were manufactured in the aforesaid manner. Thereupon, neither cracks nor fissures were found in the base material, nor bubbles after consolidation.

EXAMPLE 3

The following is a description of Example 3 according to the third embodiment.

A slurry was prepared by dispersing 1,000 g of silica powder with a particle diameter of 1 to 20 μm in 1.5 l of pure water in a vessel and then stirring the resulting dispersion system.

Also, a resin mold was arranged so that a silica-based glass rod manufactured by the VAD method and having the core-to-cladding outside diameter ratio of about ⅓, was placed in the center of the mold. The slurry was poured into the mold for casting.

A shaped body thus obtained was removed from the mold and dried in an oven at 110° C., whereupon a silica glass base material composed of the glass rod and the porous glass body (shaped body) was obtained.

Subsequently, an end portion of the porous glass body was cut in the manners shown in FIGS. 7A and 7B by means of a lathe.

The silica glass base material, lathed in this manner, was heat-treated in He and $Cl_2$ at 800° to 1,200° C., whereby it was dehydrated. Then, the material was gradually heated from its leading end, in a gas mixture of He and $O_2$ at 1,500° to 1,650° C., to be consolidated, whereupon the optical fiber preform was obtained.

This optical fiber preform was drawn to produce an optical fiber, whose transmission loss measured as low as 0.2 dB/km at 1.55-μm wavelength.

Then, the silica glass base material, having the end of its porous glass body worked in the aforesaid manner, and a conventional cylindrical base material were compared for the yield of conforming articles (base materials free from fissures and breakage), immunity from defects attributable to bubbles and the like, and total yield. Table 2 shows the result of this comparison.

TABLE 2

|  | Prior Art | Example 3 |
| --- | --- | --- |
| Yield conforming (%) | 70 | 95 |
| Bubble-free non-defective percentage (%) | 60 | 90 |

TABLE 2-continued

|  | Prior Art | Example 3 |
| --- | --- | --- |
| Total yield (%) | 42 | 86 |

As seen from Table 2, it was confirmed that the total yield obtained according to Example 3 is substantially twice as high as the conventional case.

EXAMPLE 4

The following is a description of an example of a preferred method for treating a silica glass base material.

A slurry was prepared by dispersing 400 g of silica powder with a particle diameter of 0.6 to 10 μm in water in a vessel so that the ratio of the powder to the water was 1 to 0.5. On the other hand, a core rod (glass rod) of 2-mm outside diameter was placed in the center of a water absorbing resin mold of 30-mm inside diameter and 300-mm length. In this state, the slurry was poured into the mold, whereupon water in the slurry was absorbed by the resin mold, and a shaped body was formed. When the silica powder shaped body was released from the mold when it became suitably high strength body, it adhered to the outer peripheral surface of the core rod, and the silica glass base material was formed. The material thus obtained was dried at 70° C. for 5 hours, and the resulting silica glass base material was then treated in $Cl_2$ and He atmosphere at 1,100° C. for 2 hours by the conventional method, whereby water and impurities in the material were removed for higher purity. Then, the material was transferred to a vacuum vessel, and was kept at 1,100° C. and a vacuum of $10^{-3}$ to $10^{-4}$ torr to be deaerated. Subsequently, He was introduced so that the normal pressure was reached, and the base material was left to stand for 30 minutes. The vessel was evacuated again to the aforesaid vacuum level for deaeration, and He gas was introduced so that the normal pressure was reached, and the base material was cooled to the normal temperature while maintaining the normal pressure. Then, the material was quickly transferred to a consolidation apparatus, and was heated to be consolidation in He gas atmosphere at 1,500° C. by the conventional method. The resulting preform measured 27 mm in outside diameter and 260 mm in length, and suffered no bubbles. When ten preforms were prepared by the method according to this example, none of them exhibited bubbles. These preforms were able to be evaluated without any practical problems.

EXAMPLE 5

A silica glass base material was prepared according to Example 4, and was purified by means of $Cl_2$. The purified material 60 was set in a core tube 61 of a apparatus shown in FIG. 8. A gas treatment furnace 62 of FIG. 8 was heated to 1,100° C., an airtight shutter 64 was closed, air was discharged through an exhaust valve 65 so that the vacuum level of $10^{-2}$ to $10^{-3}$ torr was reached, and this state was maintained for 30 minutes. Then, the material 60 was left to stand for 30 minutes while introducing He gas through a first gas inlet port 66 at a flow rate of 0.3 l/min, so that the material was filled with He gas. Thereafter, the shutter 64 was opened, the He gas supply through port 66 was stopped, and the material 60 was gradually lowered into a consolidation furnace 63, having been previously heated to 1,500° C., to be consolidated, while introducing He through a second gas inlet port 67 at a flow rate of 0.5 l/min. The resulting preform measured 27 mm in outside diameter and 260 mm in length, and suffered no bubbles. When ten preforms were prepared by the method according to this example, they provided the same result. These preforms were able to be evaluated without any practical problems. Example 5, which was prepared using the apparatus of FIG. 8, is superior to Example 4 in that the gas treatment and consolidation can be performed in succession, so that the movement of the material entails less contamination, and the higher operating efficiency ensures higher productivity.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A slip casting method for manufacturing a silica-base material for optical fibers, comprising the steps of:
   inserting a silica-based rod into a hollow molding space of a mold having one of a water absorbing property and a dehydrating property;
   said silica-based rod forming one of:
   (a) a core of an optical fiber to be formed; and
   (b) a core and a partial cladding of an optical fiber to be formed;
   pouring a slurry, obtained by dispersing a silica glass powder material in a quantity of pure water, into the hollow molding space of the mold between the silica-based rod as the inner surface of the hollow molding space of the mold, and forming a porous glass body around the silica-based rod as the water in the slurry is removed by one of the water absorbing and the dehydrating property of the mold.

2. The method according to claim 1, wherein said silica-based rod is manufactured by a chemical vapor deposition hydrolysis method.

3. The method according to claim 2, wherein said silica-based rod is manufactured by a VAD method.

4. The method according to claim 1, wherein an average particle diameter of said silica glass powder material ranges form 0.6 to 20 μm.

5. The method according to claim 1, wherein the step of pouring the slurry comprises:
   pouring a first slurry around the silica-based rod, said first slurry including a glass powder material having a given particle diameter, said silica-based rod being positioned in a central portion of the hollow molding space of the mold, said first slurry being poured between the silica-based rod and the inner surface of the hollow molding space so that the given diameter particles of said glass powder material are provided substantially around the silica-based rod; and
   pouring a second slurry of a glass powder material having a particle diameter size that is no larger than the given particle diameter size of the first slurry, into a peripheral portion of the hollow molding space of the mold so that said second slurry substantially separates the first slurry form the inner surface of the hollow molding space of the mold.

6. The method according to claim 5, wherein an average particle diameter of said glass powder material in the first slurry ranges form 1 to 20 μm, and an average particle diameter of said glass powder material in the second slurry ranges from 0.6 to 1 μm.

7. The method according to claim 1, wherein:
   the porous glass body has a first and a second end portion; and
   said first and second end portions of said porous glass body being shaped into one of a cone shape and a shape of a three-dimensional curved surface having a radius of curvature that is at least equal to an outside diameter of the shaped porous glass body.

8. The method according to claim 1, further comprising:
   compacting said porous glass body with the silica-based rod therein to form a compacted silica glass body; and
   using the thus compacted silica glass body for manufacturing an optical fiber preform.

* * * * *